United States Patent Office 2,707,825
Patented May 10, 1955

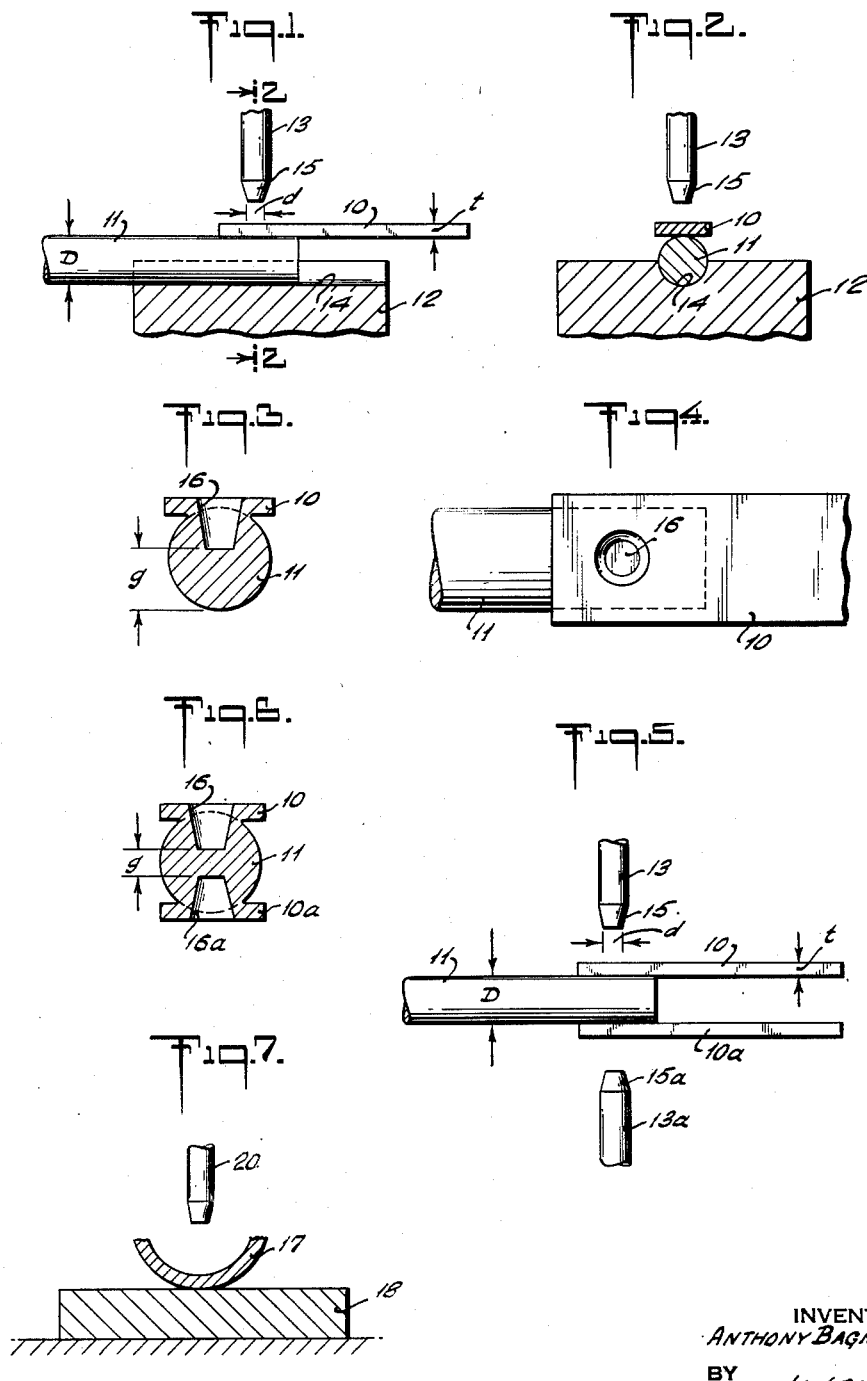

---

2,707,825

METHOD OF PRESSURE WELDING

Anthony Bagnold Sowter, Wembley, England, assignor to The General Electric Company Limited, London, England Application February 29, 1952, Serial No. 274,097

Claims priority, application Great Britain March 16, 1951

2 Claims. (Cl. 29—470.1)

The present invention relates to pressure welding, such as cold pressure welding, i. e. the joining of members of ductile metal substantially by pressure, and more particularly to the making of a lap weld between two members the adjoining surfaces of which are of a relatively curved or convex shape in respect to one another.

As is well know in indentation pressure welding, as described in my U. S. Patent No. 2,522,408, issued September 12, 1950, a proper control of the pressure applied to a pair of superposed metal members such as plates, sheets, etc., both with regard to the compressed area or shape of the weld spot and the depth of the indentation or depression left by the welding tools, will cause a favorable plastic flow of the adjoining metals at said spot so as to result in a solid phase welding bond or joint thereat.

Various forms of tools have been proposed in the past for the lap joining by cold pressure welding of sheets, plates or similar pieces of ductile and cold-weldable metal or metal alloys, such as aluminum, brass, copper, etc., and, in general, the pressure applying surface of a welding tool to effect what may be termed a single spot weld has advantageously been found to be of an oblong or rectangular shape, whereby to cause a preferred flow of the metal during welding in a direction perpendicular to the longer sides of the rectangle or pressure area, thus affording a ready and intimate merging or bonding of the metals into a solid phase welding bond.

Welding tools having a pressure applying surface of a circular or similar round shape have generally been found as unsatisfactory for cold pressure welding due mainly to the fact that the uniform radial flow of the metal away from the center of the pressure applying surface is not conducive to producing a merging or welding of the metals of the adjoining surfaces similar to a rectangular welding or pressure applying surface.

More specifically, the present invention is concerned with the lap joining by cold pressure welding of two metal members at least one of which has a surface to be welded which is round or curved in a section parallel to the direction of the applied pressure so as to present a convex surface to the adjacent surface of the other member. As a result of the relative curvature of the surfaces, a preferential lateral metal flow will occur during the pressure application, somewhat analogously as in the case when using a rectangular pressure area in connection with flat members such as strips or plates. This makes it possible to use a round, such as a circular, pressure tool or die for spot welding curved members of this type by one or more indentation pressure welds. Among other advantages, such round or circular spot welds are especially suitable where it is desirable or necessary to save length in the joint or where the welding connection constitutes a preparatory step for subsequent working or forging of the welded joint into a desired shape.

An object of the invention is, therefore, the provision of a simple and efficient method of and means for joining a pair of relatively curved metal members by a pressure welding process.

While the invention is especially applicable to cold pressure welding, that is, the welding of two members to be joined substantially by pressure without the supply of external heat, it will be understood that some heat may be used, such as by heating the welding tools or preheating the members to be welded, provided, however, that welding is effected predominantly by the plastic flow of the metals of the adjoining surfaces of said members as a result of the pressure applied by the welding tools.

In order, therefore, to effect a round, such as circular indentation pressure weld according to the invention, all that is required is that the two surfaces to be welded together meet along a line and that one or both surfaces recedes or recede from the other or from each other, away from said line, in such a manner as to allow of a preferential metal flow in one direction at right angle to said line during the pressure application by the substantially round welding tool or tools. Thus a member of rounded, such as circular, section (cylinder, rod, etc.) may be welded to a member of rectangular section (plate, lug, etc.) or, in effect, any two members having relatively curved adjacent surfaces, may be lap welded by a tool having a substantially flat circular pressure applying surface, as will be described in greater detail hereinafter.

The invention, among many other uses, finds special application in the connection of an electric terminal, such as a tag, lug, etc. to a wire or conductor of circular cross-section and having a diameter being a substantial multiple of the thickness of said lug or equivalent fixing member.

Further objects as well as novel aspects of the invention will become more apparent from the following detailed description of a few practical embodiments thereof, considered in conjunction with the accompanying drawing, forming part of this specification, and wherein:

Figure 1 shows schematically a tool assembly for pressure welding together a metal rod and plate according to the invention, the parts being shown in their position prior to welding;

Figure 2 is a sectional view taken on the line 2—2 of Figure 1;

Figures 3 and 4 are cross-sectional and plan views, respectively, shown on an enlarged scale, of a joint obtained by means of the tool shown in Figures 1 and 2;

Figure 5 shows a tool assembly similar to Figure 1 for welding a pair of strips or plates to a rod or similar member;

Figure 6 shows, on an enlarged scale, a cross-section through a joint obtained by means of the tool according to Figure 5; and Figure 7 illustrates a further example of two members having relatively curved surfaces and suitable for spot pressure welding according to the invention.

Like reference characters identify like parts in the several views of the drawing.

Referring more particularly to Figures 1 and 2, the strip or plate 10 to be welded to a rod or cylinder 11 having a diameter D equal to a multiple of the gauge thickness $t$ of said strip or plate, is laid or superimposed upon the upper side of said rod as shown. Both the plate 10 and rod 11 consist of aluminum, copper, or other ductile pressure weldable metal or metal alloy.

Before positioning the members as shown in the drawing, the areas of contact to be joined are suitably cleaned, such as by scratch-brush treatment, to remove surface oxide and other foreign matter and to provide exposed pure metallic surfaces. The members are then held in position in a suitable jig which may or may not include the necessary welding tools shown, in the example illustrated, as comprising a lower anvil 12 and an upper cooperating pressure tool or pin 13. In the example shown, the anvil 12 is provided with a groove having a cross-section conforming to the lower portion of the rod 11 and serving as a means to hold and locate the rod during welding. The groove 14 may conform to the lower half or cross-section of the rod, as shown in the drawing, but the depth of the groove may be substantially less to hold the rod during welding. If desired, other suitable means for positioning the rod during welding may be employed. The anvil 12 as well as the welding pin 13 are of steel, the center line of the pin passing through the central or symmetry plane of the superposed members 10 and 11. The welding pin 13 is slightly tapered at its lower end, as shown, to provide a flat faced circular welding tip 15 having a diameter $d$ determined by the dimensions of the members to be welded, as described in detail hereinafter. The tapering shape of the pin will enable a more easy removal from the work after welding.

In order to effect a weld, the pin 13 is brought down upon the superposed members 10 and 11 or driven towards the anvil 12 in a suitable press, to effect an indentation 16, as shown in Figures 3 and 4, in both the strip or plate 10 and the rod 11 by the tip 15, until reaching a final gap $g$, Figure 3, between the tools. As a result of the pressure applied by the pin 13, the metal of the adjoining surfaces of the members 10 and 11 is displaced on both sides of the axis of the member 11 and, on account of the curved or rounded shape of the latter, there results a preferential lateral flow of the metal, whereby to allow a satisfactory merging or welding of the members into a solid phase welding bond, as shown in Figures 3 or 4.

This method may simply be used for the purpose of tack welding the strip 10 to the rod 11 and the two members may ultimately be solidly compacted together or worked into a desired final shape having a smooth cylindrical surface by a subsequent forging process.

Figure 5 shows a similar tool arrangement for welding two strips 10 and 10a to the opposite sides of the rod 11. For this purpose a pair of pressure tools or pins 13 and 13a having tips 15 and 15a are provided, pin 13a replacing the anvil 12 in Figure 1. As is understood, the members 10 and 11 and the pressure pins 13 and 13a may be held in a suitable jig forming part of a press in which the elements are incorporated. As a result, a double-sided weld is obtained having a cross-section as shown on an enlarged scale in Figure 6 with opposite indentations or depressions 16 and 16a and a final gap or weld thickness $g$.

In an experimental example of a weld of the type shown in Figure 6, the member 10 consisted of a copper rod of a diameter $D=\%_{16}''$ (.187''), the strips 10 and 10a also consisted of copper having a gauge thickness $t=.040''$, while the pressure applying surfaces of the welding tips 15 and 15a had a diameter $d=.080''$. Pressure was applied by the tools 13 and 13a to effect depressions 16 and 16a in the member until reaching a final weld thickness $g=.056''$.

While in the example described, the diameter $d$ of the pressure applying area of the welding tools is about twice the gauge thickness $t$ of the strip or strips 10 and 10a, this value may be varied within limits from about 1.5 to 2.5 times the gauge thickness, in order to secure satisfactory results.

As will be understood, a circular indentation spot weld of the type according to the invention is especially suitable where the radius of curvature of one of the members is a multiple of, practically at least twice, the gauge thickness $t$ of the other member or members, without exceeding an upper limit, say about ten times said gauge thickness, where the adjoining surfaces of the members assume a substantially flat condition. In the first case, that is, with the radius of curvature approaching or being less than the gauge thickness $t$, other techniques of welding must be used, such as described in my pending application Serial No. 259,059, filed November 30, 1951, entitled Means for and Method of Making Cold Weld Joints, while in the case of a comparatively large radius of curvature compared with the gauge thickness $t$, the surface at the weld spot assumes a flat condition, in which case a rectangular weld spot, as described in the above-mentioned patent, must be used to effect satisfactory welding.

The depth of the indentation or amount of tool penetration at the weld spot depends upon the metal, being about 2.5 times the gauge thickness $t$ of the member of lesser thickness in the example illustrated for copper, or about 1.7 times the gauge thickness in the case of aluminum. This ratio corresponds to the relative degree of cold-weldability or "figure of merit" of the respective metal as given in the above-mentioned patent. Since aluminum has the highest degree of cold-weldability, the minimum depression of about 1.7 times the gauge thickness $t$ also represents a general minimum for other metal or alloys capable of cold pressure welding.

From the above it follows that the invention is especially suitable for welding a relatively thin member to a thicker member to allow of a sufficient tool penetration necessary to effect welding, the weld indentation being made from the side of the thinner member. However, if the required tool penetration is less than twice the gauge thickness such as in the case of aluminum, good welds may be obtained with members of substantially equal thickness, providing a proper relative curvature of the surfaces being joined, as pointed out.

In the preceding views illustrating the welding of a relatively thin member (lug, plate, etc.) to a relatively thicker member (rod, cylinder) the thinner member is shown to have a flat or plane surface while the thicker member has a curved surface. Figure 7 shows a modification wherein the thicker member 18 has a plane surface and the thinner member 17 is bent or curved, thus again providing a relative curvature between the adjoining surfaces conducive to favorable metal flow in a lateral direction during welding. Furthermore, both adjoining surfaces may be curved away from each other on both sides of their initial contacting line, the thickness of the members being either equal or differing from one another and the pressure application being made upon the thinner member, in the manner described herein.

In the foregoing, the invention has been described with reference to a specific illustrative device and method. It will be evident, however, that variations and modifications, as well as the substitution of equivalent elements and steps for those shown and described, may be made without departing from the broader scope and spirit of the invention, as set forth in the appended claims. The specification and drawing are accordingly to be regarded in an illustrative rather than in a limiting sense.

I claim:

1. A method of joining a pair of plates to a member of substantially circular cross-section, said plates and member consisting of cold pressure weldable metal, comprising providing the areas of said plates and member to be joined with uncontaminated metallic surfaces, placing said member between said plates with the inner surfaces of the plates adjacent to said member contacting the same at substantially linear interfacial areas, and applying to opposed localized areas of the outer surfaces of said plates and in a direction at right angle thereto a pressure, to effect indentations extending through said plates and into said member and to distort the metal of said member at and near said interfacial areas, to change the same from their initial linear configuration into extended lateral areas and to create an intensive interfacial metal flow at the extended areas conducive to welding said plates to said member by a solid phase welding bond.

2. A method of joining a pair of plates to a member of substantially circular cross-section, said plates and member consisting of cold pressure weldable metal, comprising providing the areas of said plates and member to be joined with uncontaminated metallic surfaces, placing said member between said plates with the inner surfaces of the plates adjacent to said member contacting the same at substantially linear interfacial areas, and applying to opposed circular welding areas of the outer surfaces of said plates and in a direction at right angle thereto a pressure, said welding areas having a diameter from about 1.5 to 2.5 times the gauge thickness of said plates, to effect indentations extending through said plates and into said member and to distort the metal of said members at and near the interfacial areas, to change the same from their initial linear configuration into extended lateral areas and to create an intensive interfacial metal flow at the extended areas conducive to welding said plates to said member by a solid phase welding bond.

References Cited in the file of this patent

UNITED STATES PATENTS

| | | |
|---|---|---|
| 477,465 | Smith | June 21, 1892 |
| 487,939 | Smith | Dec. 13, 1892 |
| 1,541,513 | Knoop | June 9, 1925 |
| 1,812,151 | Jacocks | June 30, 1931 |
| 2,254,558 | Williams | Sept. 2, 1941 |
| 2,268,493 | O'Brien | Dec. 30, 1941 |
| 2,522,408 | Sowter | Sept. 12, 1950 |
| 2,560,678 | Wirt | July 17, 1951 |

OTHER REFERENCES

The Welding Journal (Sowter), February 1949, pages 149–152.